(12) United States Patent
Kass et al.

(10) Patent No.: US 6,199,909 B1
(45) Date of Patent: Mar. 13, 2001

(54) TRAILER

(75) Inventors: John J. Kass; Richard W. McCoy, both of Granger, IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

(21) Appl. No.: 09/269,150

(22) Filed: Mar. 16, 1999

Related U.S. Application Data

(60) Provisional application No. 60/026,489, filed on Sep. 23, 1996, and provisional application No. 60/028,893, filed on Oct. 18, 1996.

(51) Int. Cl.[7] .................................................. B62D 63/06
(52) U.S. Cl. ........................... 280/789; 280/656; 296/181
(58) Field of Search .................................... 280/292, 656, 280/789; 296/181, 182

(56) References Cited

U.S. PATENT DOCUMENTS

| | | |
|---|---|---|
| Re. 32,647 | 4/1988 | Wilson . |
| D. 268,101 * | 3/1983 | Pope et al. .......................... D12/104 |
| 4,126,324 | 11/1978 | Browning . |
| 4,165,096 | 8/1979 | Lewis, Jr. et al. . |
| 4,196,918 | 4/1980 | Strader . |
| 4,372,568 | 2/1983 | Campbell . |
| 4,502,725 * | 3/1985 | Wiant .................................... 296/181 |
| 4,537,441 | 8/1985 | McCleary . |
| 5,249,821 | 10/1993 | Ricketts et al. . |

\* cited by examiner

*Primary Examiner*—Paul N. Dickson
(74) *Attorney, Agent, or Firm*—King and Schickli, PLLC

(57) ABSTRACT

A trailer (10) is provided having a framework (12) carrying ground engaging wheels (14), a body (16) having a corrugated bottom wall and defining a storage compartment and a tiedown fastener for securing the body to the framework through the corrugated bottom wall. The trailer includes an interchangeable top (18) and tailgate. The trailer also includes a novel spring assembly. The spring assembly includes a leaf spring with an anchoring aperture at one end and a mounting tongue at the other. The mounting tongue is captured between the framework and a fastener and provides relative sliding movement. Additionnally, the sidewalls of the trailer include aligned slots (70) that receive a strut which supports an optional shelf.

18 Claims, 4 Drawing Sheets

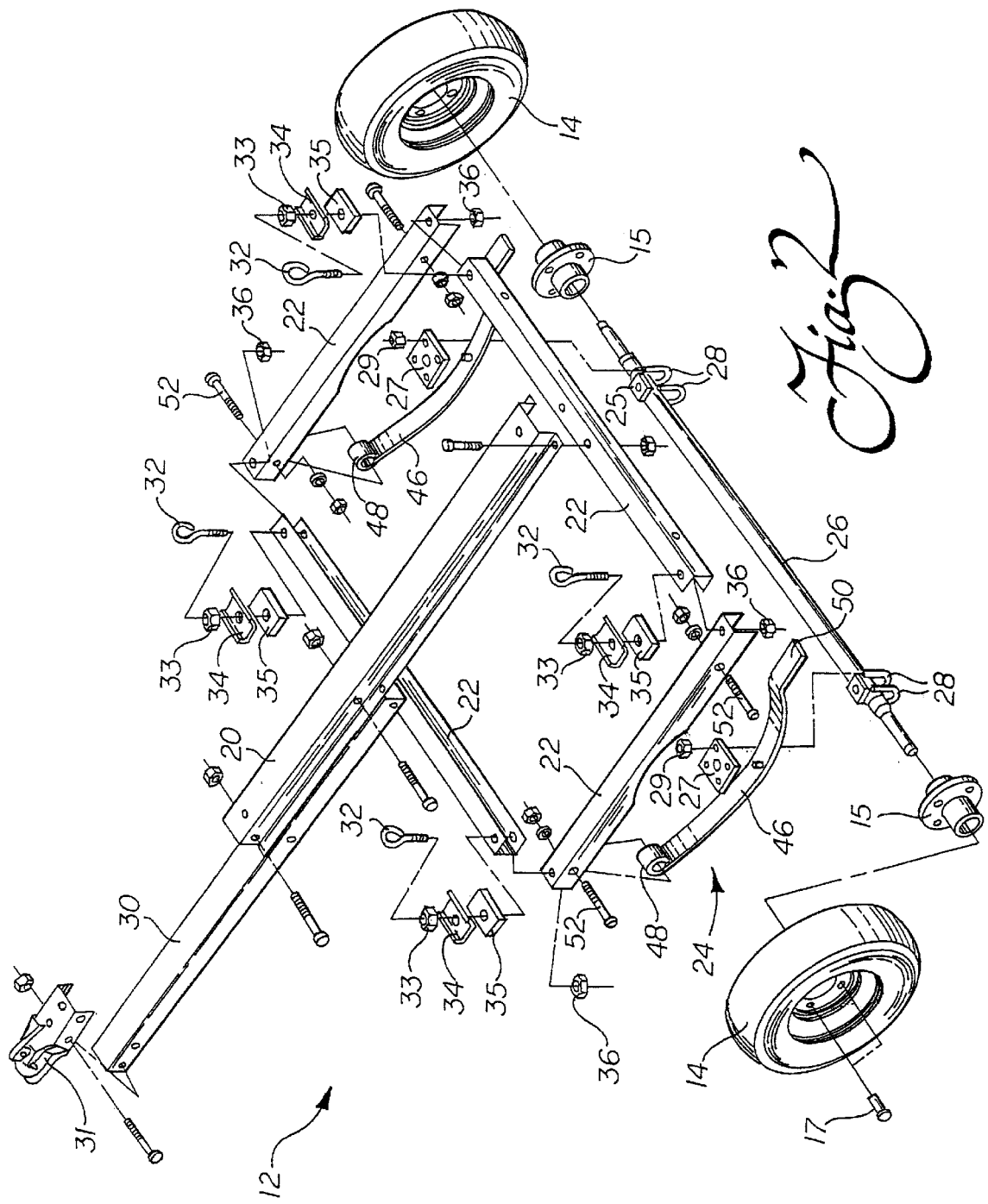

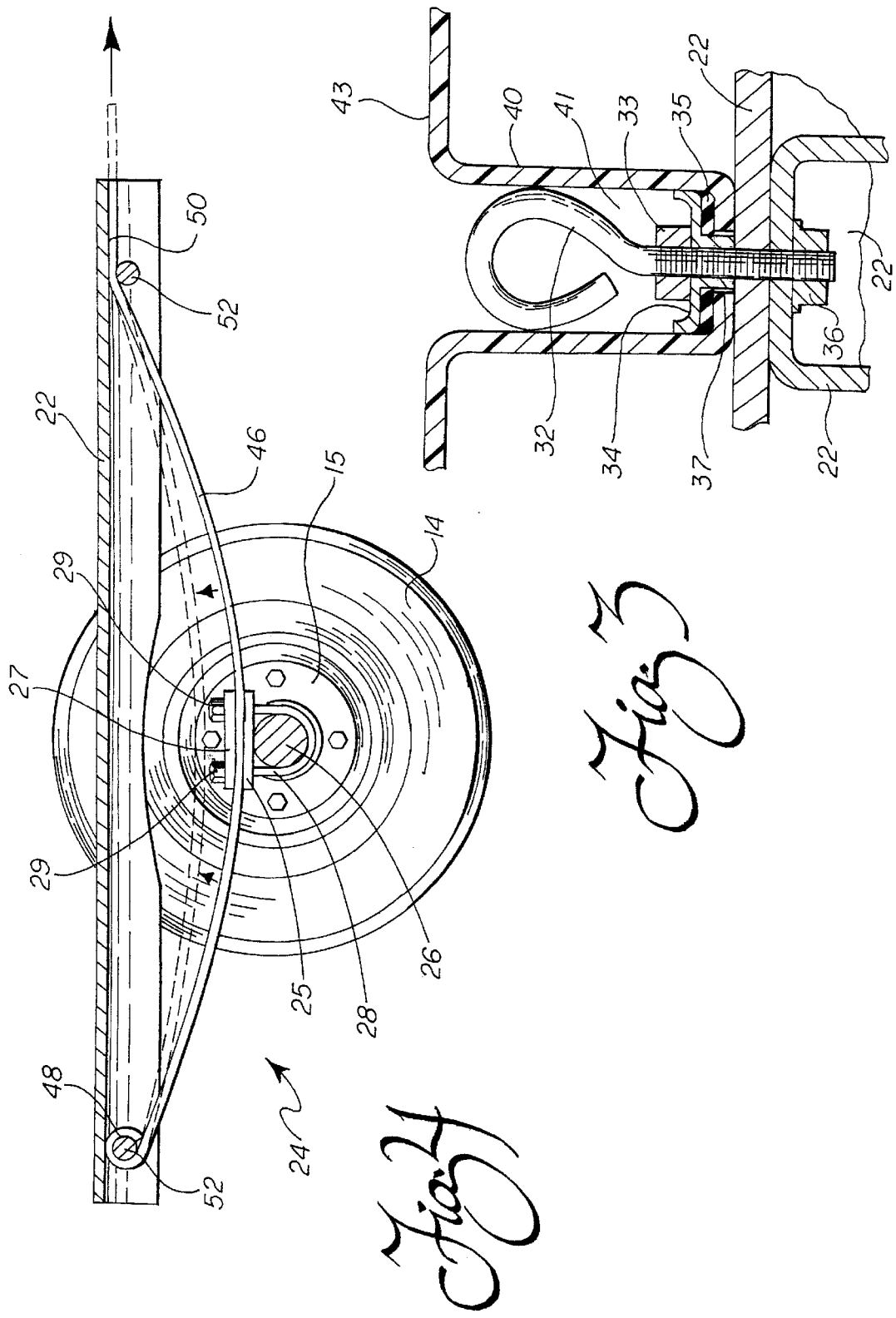

US 6,199,909 B1

TRAILER

This application claims the benefit of U.S. Provisional Application No. 60/026,489, filed Sep. 23, 1996 and U.S. Provisional Application No. 60/028,893 filed Oct. 18, 1996.

TECHNICAL FIELD

The present invention relates generally to a trailer for towing behind a towing vehicle and, more specifically, to the connection between the body and frame of the trailer and the spring assembly for supporting the weight of the trailer.

BACKGROUND OF THE INVENTION

It has long been known to tow a utility trailer behind a vehicle so as to allow one to haul loads of material that may be too large or otherwise ill-suited to be transported in the vehicle itself. For many individuals a small, compact trailer is desired since it may be effectively utilized for most any anticipatable application yet may be conveniently stored in a minimum amount of space when not in use. Examples of compact utility trailers of the type being described are disclosed in U.S. Pat. No. 4,196,918 to Strader; U.S. Pat. No. 4,165,096 to Lewis et al. and U.S. Pat. No. 4,372,568 to Campbell.

While utility trailer designs such as set forth in these patents are generally effective for their intended purposes overall improvements in design are still possible. For example, it is desirable to reduce the overall weight of the trailer while still maintaining a relatively high payload capacity. In this way full advantage is taken of the trailer's utility while handling convenience and ease of trailer manipulation during use and storage are enhanced. It is also desirable to increase the versatility of the trailer so that it is particularly well suited to handle various types of payloads including but not limited to (1) containers such as luggage, cartons, bags and boxes, (2) aggregates such as gravel, sand, mulch and other gardening supplies and materials and (3) relatively delicate items that cannot be stacked without risk of damage such as glassware, various types of artwork, certain food products and the like. Additionally, it is desirable to provide a trailer designed to furnish the utmost utility and ride stability that is also relatively simple and economical to manufacture. Only in this way is it possible to meet the needs and budgets of most consumers and thereby bring the benefits of trailer ownership to a larger segment of the population.

SUMMARY OF THE INVENTION

It is a primary object of the present invention to provide a relatively lightweight trailer of inexpensive construction adapted for towing behind a towing vehicle.

Another object of the present invention is to provide a trailer of unique construction wherein cargo tie downs provided in the storage compartment of the body of the trailer also effectively function as the connectors for securing the body to the frame of the trailer.

Still another object of the present invention is to provide a trailer of lightweight, simplified construction which still provides a rigid, versatile platform for handling various goods and materials.

Yet another object is the provision of an inexpensive spring assembly for a lightweight trailer.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a lightweight trailer is provided. The trailer may be generally described as comprising a framework carrying ground engaging wheels, a body, preferably formed from molded plastic, having a corrugated bottom wall and a fastener for securing said body and framework together through said corrugated bottom wall. Preferably the fastener is a threaded eye bolt and cooperating nut. Advantageously, the eye bolt end of such as fastener projects into the storage compartment formed by the body of the trailer where it may be used as a tiedown point to secure cargo in place and prevent shifting movement during vehicle operation.

In the most preferred embodiment, the molded plastic body is mounted directly to the underlying framework. More specifically, the corrugated bottom wall includes a mounting aperture that receives the fastener. A drawn metal cup retainer receives the eyebolt and nut and directly engages the framework. A cooperating rubber washer serves to hold the body in place.

In accordance with another aspect of the present invention, the trailer includes a top that is selectively secured to the body for closing the storage compartment defined by the body. Preferably, the top provides a watertight, weatherproof seal. Additionally, the trailer includes a tailgate that may be selectively secured to the body for closing a rear wall of the body. The top and tailgate are interchangeable. With the top in place the trailer may be utilized to carry materials, goods and cargo that it is desired to protect from the weather. Alternatively, when the tailgate is used the trailer may be utilized to carry, for example, aggregate or bulk materials (e.g. mulch, dirt, sand, gravel) that do not require weather protection.

As an additional feature, the opposing side walls of the body include aligned slots adapted to receive a reinforcing strut such as a wood 2×4 for supporting a second floor in the trailer spaced above the corrugated bottom wall. This substantially increases the versatility of the trailer when carrying certain cargos and goods. Thus, the trailer may be adapted for special applications as desired.

In accordance with another aspect of the present invention, a spring assembly is provided for securing the ground engaging wheels to the framework. Preferably, the spring assembly includes a leaf spring having an anchoring aperture at a first end and an elongated mounting tongue at a second end, a pair of spring fasteners for securing the leaf spring to the framework and means for mounting the ground engaging wheels to the frame assembly. The associated method of mounting the leaf spring to the framework of the trailer comprises providing a leaf spring with an anchoring aperture at one end and a mounting tongue at the other, opposite end and securing a first fastener through the anchoring aperture of the leaf spring and the framework. This is followed by the securing of a second fastener to the framework so as to capture the mounting tongue between the framework and the fastener whereby the mounting tongue slides relative to the framework and the fastener as the leaf spring supports the trailer weight and absorbs shocks from the roadway during trailer towing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a perspective view showing the framework of the trailer;

FIG. 3 is a detailed, partially cross-sectional view showing the connection of the body of the trailer with the framework by means of an eye bolt and cooperating nut;

FIG. 4 is a detailed view showing the spring assembly of the trailer;

Reference will now be made in detail to the present preferred embodiment of the invention, an example of which is illustrated in the accompanying drawing.

DETAILED DESCRIPTION OF THE INVENTION

Figure 1:
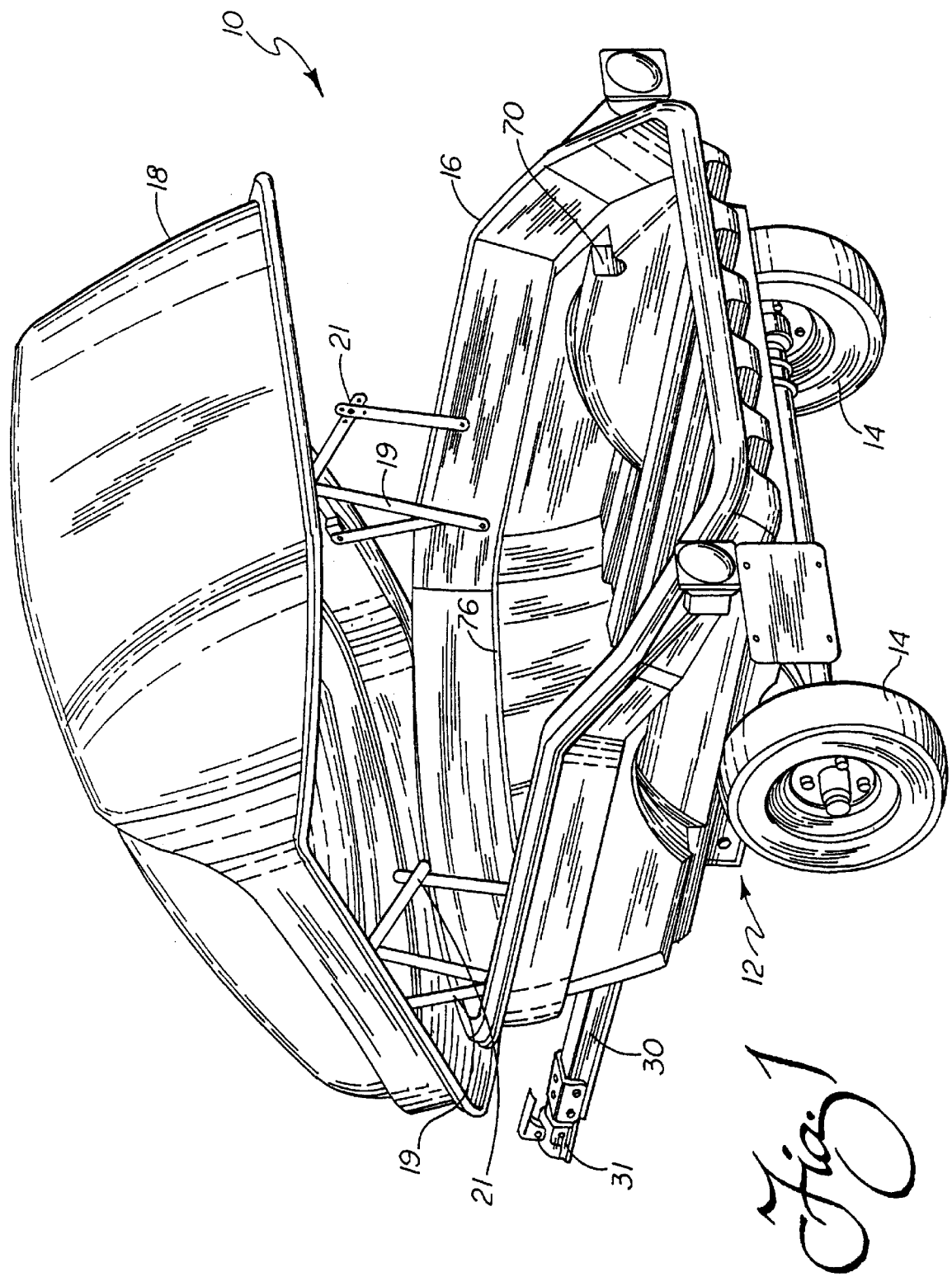
FIG. 1 is a perspective view showing the trailer of the present invention with the interchangeable top in place and open.

Reference is now made to FIGS. 1 and 2 which illustrate the trailer 10 of the present invention. As shown in FIG. 1, the trailer 10 generally includes a framework 12 carrying a pair of ground engaging wheels 14, a body 16 that defines an interior storage compartment and a top or lid 18 that engages the body 16 and closes the storage compartment. Preferably, the framework 12 is constructed from a strong, metal (e.g. steel, aluminum) while the body 16 and top 18 are molded from lightweight plastic (e.g. high density polyethylene, ABS). Hinges 19 may be utilized to attach the top 18 to the body 16 so that the top may be pivoted relative to the body to allow access to the storage compartment. The hinges 19 are shown located at either side of the trailer. The hinges 19 could, however, be provided at the front and rear to provide a side opening top. Two struts 21 are provided to hold the top 18 in the open position.

The framework 12 is best shown in FIG. 2. As shown the framework 12 includes an elongated central frame member 20 connected to a rectangular subframe 22. The rectangular subframe 22 carries a pair of spring assemblies 24 that are secured to an axle 26 by means of the cooperating anchor plates 25, 27, a pair of u-bolts 28 and cooperating nuts 29. It is the axle 26 that, of course, carries the ground engaging wheels 14 mounted on the hubs 15 by lug bolts 17.

The front end extension 30 of the central frame member 20 is connected to a trailer coupler 31 of a type well known in the art for engaging a hitch ball carried on the hitch bar connected to the towing vehicle (not shown). This allows the trailer 10 to be selectively connected to and disconnected from the towing vehicle as desired by the operator.

As best shown in FIG. 3, a fastener 32 in the form of a threaded eye bolt including a cooperating nut 34 may be utilized to secure the body 16 to the subframe 22 of the framework 12. More specifically, four such fasteners 32 are provided, one at each corner of the subframe 22 for this purpose. Specifically, the body 16 is positioned on the framework 12 so that four mounting apertures provided in the body 16 are aligned with four cooperating apertures adjacent the four corners of the subframe 22. Next, a nut 33 is installed on each eyebolt fastener 32. Each eyebolt fastener 32 is then inserted through a drawn cup retainer 34, a cooperating rubber washer 35 and the body 16 then through the rectangular subframe 22. A flanged nut 36 is then installed on each eyebolt fastener 32 and tightened to the desired torque. The aperture 37 in the body 16 is larger than the diameter of the drawn cup retainer 34 so that the body can move to compensate for differential expansion rates of the steel subframe 22 and the plastic body 16 as the temperature changes. Each rubber washer 35 is clamped tight to seal the aperture against weather intrusion. Since an eyebolt fastener 32 is connected at each corner of the subframe 22 as described, a secure four point connection is provided between the body 16 and framework 12.

Advantageously, it should be appreciated that the heads of the eye bolt fasteners 32 provide a convenient point that may be utilized to secure cargo in the storage compartment utilizing a string(s), rope(s), elastic cord(s) or other appropriate fastening device(s). Advantageously, this prevents shifting of the cargo in the storage compartment during towing thereby increasing the stability of the trailer 10. Further, it allows a conveniently and readily available connection point at four advantageously spaced points in the cargo compartment. It should also be appreciated that the construction shown provides for a very lightweight trailer which still is characterized by significantly rigid structure to provide very significant towing capacity. For example, a trailer of approximately 180 to 200 pounds is capable of carrying 550 pounds of payload. More specifically, it should be appreciated that the molded body includes a deeply corrugated bottom wall 40 for added strength. Specifically, the corrugations are between 1–3 inches and more preferably 2 inches in height.

Further, it should be appreciated that the head of each eye bolt fastener 32 is fully received in the channel 41 formed by the corrugated bottom wall 40; that is, the eye bolts do not project above the floor 43 formed by the bottom wall. Accordingly, the eye bolt fasteners 32 may be utilized to tie down cargo yet at the same time they do not project above the floor 43 of the storage compartment and, accordingly, do not interfere with or prevent full and free use of the entire cargo area.

In accordance with an additional aspect of the present invention, each spring assembly 24 of the trailer 10 is also unique. More specifically, each spring assembly incorporates a leaf spring 46 having an anchoring aperture 48 at a first end and an elongated mounting tongue 50 at a second opposite end. Further, each spring assembly 24 includes a pair of spring fasteners 52 in the form of bolts and cooperating nuts for securing the leaf spring 46 to the subframe 22 of the framework 12. Further, as already described, each spring assembly 24 includes u-bolts 28 that functions as a means for mounting the axle 26 which carries the ground engaging wheels 14. As should be appreciated best from reviewing FIG. 4, the leaf spring 46 is secured to the subframe 22 by securing a first of the spring fasteners 52 through the anchoring aperture 48 and cooperating mounting apertures in the subframe 22. Next is the securing of the second fastener 52 to the subframe 22 so as to capture the mounting tongue 50 in a channel formed by the substantially u-shaped subframe 22. In this way, the mounting tongue 50 is allowed to slide along the subframe 22 while held captured by the fastener 52. Accordingly, each leaf spring 46 is effectively provided with a traveling anchoring point (i.e. the point of engagement between the mounting tongue 50 and the subframe 22) which allows the leaf spring to better support the trailer and its payload as well as cushion bumps and shocks during trailer towing.

Figure 5:
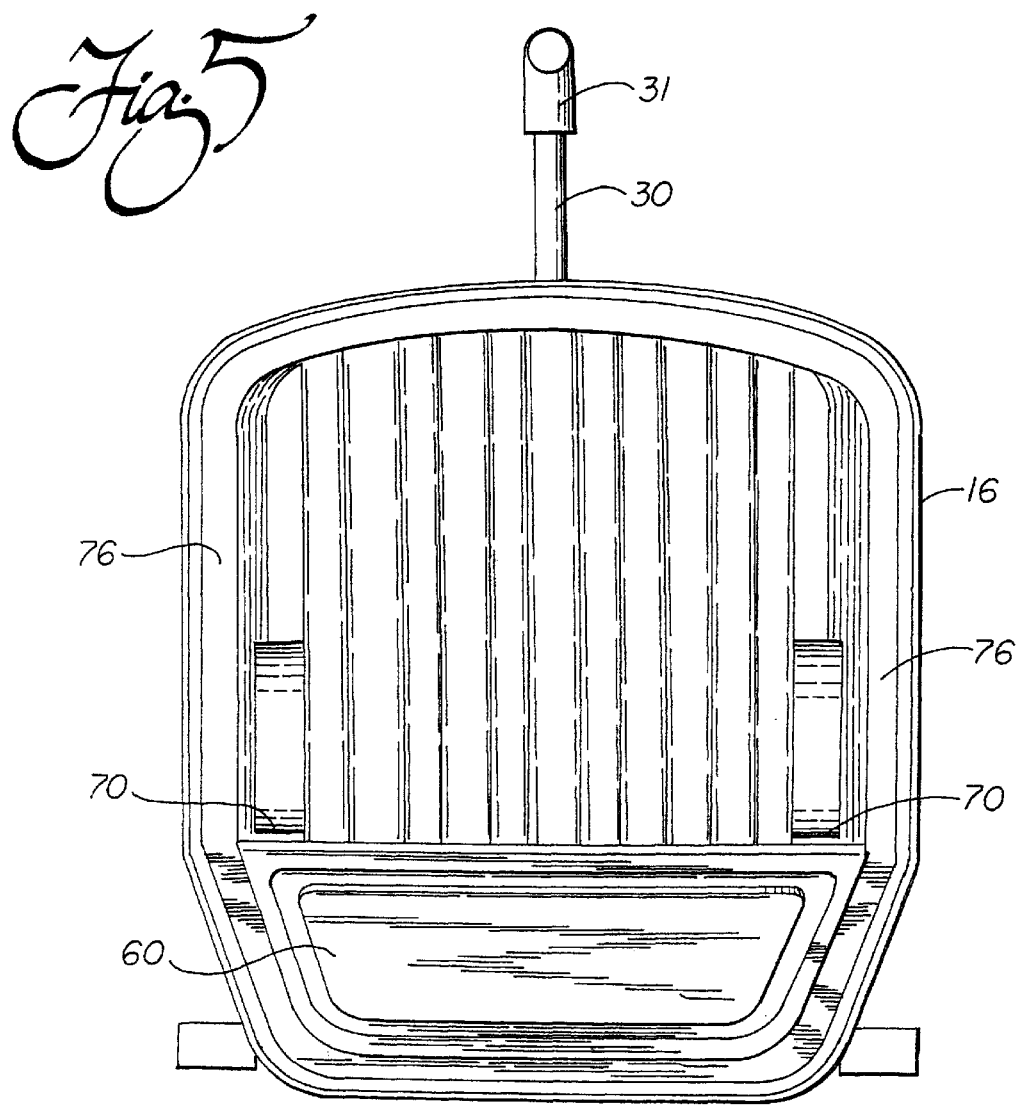
FIG. 5 is a top plan view showing the reinforcing strut receiving slots formed in opposing sidewalls of the trailer incorporating the interchangeable tailgate.
Figure 6:
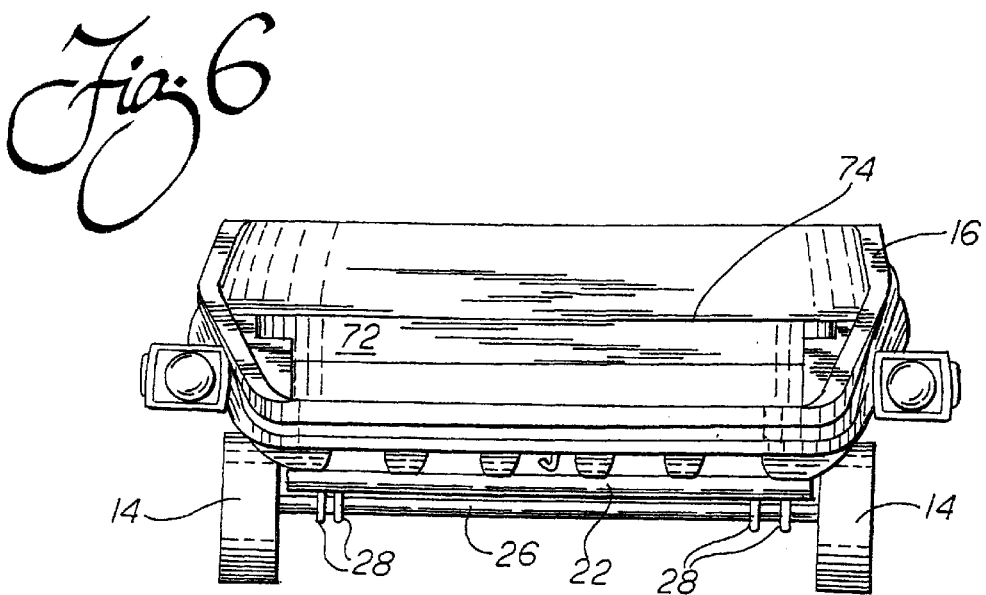
FIG. 6 is a rear elevational view showing the trailer equipped with a second floor or shelf supported by a reinforcing strut received in the slots shown in FIG. 5.

In accordance with yet another aspect of the present invention, reference is made to FIG. 5 showing a trailer tailgate 60 that may be received between the opposing sidewalls 62, 64 of the trailer body 16 above the relatively short rearwall 66. The tailgate 60 may be secured in position by means of connecting pins (not shown) or in any other way known in the art for securing tailgates to trucks and/or trailers. The provision of an interchangeable top 18 and tailgate 60 advantageously adds to the versatility of the trailer 10. When in use with the top 18, the trailer 10 provides a weather proof storage compartment within the body 16. When in use with the tailgate 60, the trailer 10 may be utilized to haul construction, landscaping and other materials or goods. Of course, the trailer may also be utilized without either the top 18 or tailgate 60. Thus, the trailer 10 is convertible between a number of configurations that may be adapted to any particular application as required by the operator.

The versatility of the trailer 10 is also further enhanced by the provision of aligned slots 70 which are provided in the opposing sidewalls 62, 64 of the trailer 10. Specifically, the slots 70 may be molded in place and are adapted to receive any form of reinforcing struts such as, for example, a wood 2×4 cut to length. One or more sets of cooperating aligned slots 70 may be provided. When a reinforcing strut 72 is provided in a set of aligned slots 70, the strut 72 bridges across the body 16 and provides support for an optional shelf 74 that also rests upon the lip 76. The optional shelf 74 may be formed from plywood or any other appropriate material. This feature allows the stacking of articles within the storage compartment of the trailer 10 that might not otherwise support their own weight. Thus, it should be appreciated that this feature advantageously enhances the versatility of the trailer 10 allowing it to again be utilized for many unique applications.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer for towing behind a towing vehicle, comprising:
   a framework carrying ground engaging wheels;
   a body having a corrugated bottom wall and defining a storage compartment;
   a fastener for securing said body to said framework through said corrugated bottom wall; and
   a top that is selectively secured to said body for closing said storage compartment defined by said body and a tailgate that is selectively secured to said body for closing a rear wall of said body, said top and tailgate being interchangeable.

2. A trailer for towing behind a towing vehicle, comprising:
   a framework carrying ground engaging wheels;
   a body having a corrugated bottom wall and defining a storage compartment;
   a threaded eye bolt fastener for securing said body to said framework through said corrugated bottom wall; and
   a top that is selectively secured to said body for closing said storage compartment defined by said body and a tailgate that is selectively secured to said body for closing a rear wall of said body, said top and tailgate being interchangeable.

3. The trailer set forth in claim 2, wherein said corrugated bottom wall includes a mounting aperture for receiving said fastener and said body is secured directly to said framework.

4. The trailer set forth in claim 3, further including a drawn cup retainer and a rubber washer on said fastener.

5. The trailer set forth in claim 1, wherein said body includes aligned slots in opposing sidewalls for receiving a reinforcing strut for supporting a second floor spaced from said bottom wall.

6. The trailer set forth in claim 1, further including a spring assembly for securing said ground engaging wheels to said framework.

7. The trailer set forth in claim 6, wherein said spring assembly includes (a) a leaf spring having an anchoring aperture at a first end and an elongated mounting tongue at a second end, (b) a pair of spring fasteners for securing said leaf spring to said framework and (c) means for mounting said ground engaging wheels to said spring assembly.

8. The trailer set forth in claim 1, wherein said fastener is a tie down.

9. The trailer set forth in claim 1, wherein said threaded eyebolt fastener further includes a pair of cooperating nuts for tightly said body and said framework therebetween.

10. The trailer set forth in claim 1, wherein a head of said threaded eye bolt is received in a channel formed by said corrugated bottom wall.

11. The trailer set forth in claim 1, wherein said body includes opposing sidewalls, each of said opposing sidewalls including at least one slot.

12. The trailer set forth in claim 11, further including a reinforcing strut for receipt in said at least one slot and a shelf for resting on said strut.

13. A trailer for towing behind a towing vehicle, comprising:
   a framework carrying ground engaging wheels;
   a body carried on said framework having a bottom wall and defining a storage compartment;
   wherein said body includes opposing sidewalls, each of said opposing sidewalls including at least one slot; and
   further including a reinforcing strut for receipt in said at least one slot and a shelf for resting on said strut.

14. The trailer set in claim 13, wherein said sidewalls also include an integral lip for supporting said shelf.

15. A trailer for towing behind a towing vehicle, comprising:
   a framework carrying ground engaging wheels;

a body having a corrugated bottom and defining a storage compartment; and a threaded eye bolt fastener for securing said body to said framework through said corrugated bottom wall;

said trailer being characterized by a head of said eyebolt fastener projecting upwardly from said bottom wall into said storage compartment so as to function as a tie down.

16. The trailer of claim 15, wherein said threaded eyebolt fastener further includes a pair of cooperating nuts for tightly engaging said body and said framework therebetween.

17. The trailer of claim 15, wherein said head of said eyebolt fastener is received in a channel formed by said corrugated bottom wall.

18. A trailer for towing behind a towing vehicle, comprising:

a framework carrying ground engaging wheels;

a body carried on said framework, said body having a bottom wall and opposing sidewalls defining a storage compartment;

aligned slots provided in said opposing sidewalls;

at least one reinforcing strut received in said aligned slots; and a second floor supported on said at least one reinforcing strut spaced from said bottom wall.

* * * * *

UNITED STATES PATENT AND TRADEMARK OFFICE
CERTIFICATE OF CORRECTION

PATENT NO. : 6,199,909 B1
DATED : March 13, 2001
INVENTOR(S) : John J. Kass, Richard W. McCoy Page 1 of 1

It is certified that error appears in the above-identified patent and that said Letters Patent is hereby corrected as shown below:

<u>Title page,</u>
Insert "[22] PCT Filed: September 22, 1997
    [86] PCT No: PCT/US97/17070
      § 371 Date: March 16, 1999
      § 102(e) Date: March 16, 1999
    [87] PCT Pub. No.: WO 98/12100
      PCT Pub. Date: March 26, 1998"

<u>Column 6,</u>
Line 26, replace "claim 1" with -- claim 2 --.
Line 30, replace "claim 1" with -- claim 2 --.
Line 39, replace "claim 1" with -- claim 2 --.
Line 41, replace "claim 1" with -- claim 2 --.
Line 43, after "for tightly" insert -- engaging --.
Line 44, replace "claim 1" with -- claim 2 --.
Line 47, replace "claim 1" with -- claim 2 --.

Signed and Sealed this

Sixth Day of November, 2001

Attest:

*Nicholas P. Godici*

*Attesting Officer*

NICHOLAS P. GODICI
*Acting Director of the United States Patent and Trademark Office*